(12) United States Patent
Sun et al.

(10) Patent No.: US 11,582,781 B2
(45) Date of Patent: Feb. 14, 2023

(54) SPS SUPPORT FOR MULTI-TRP

(71) Applicant: QUALCOMM Incorporated, San Diego, CA (US)

(72) Inventors: Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/536,215

(22) Filed: Aug. 8, 2019

(65) Prior Publication Data

US 2020/0053756 A1    Feb. 13, 2020

Related U.S. Application Data

(60) Provisional application No. 62/717,680, filed on Aug. 10, 2018.

(51) Int. Cl.
*H04W 72/12*    (2009.01)
*H04W 72/1273*   (2023.01)

(52) U.S. Cl.
CPC ............ *H04W 72/1273* (2013.01); *H04W 72/1289* (2013.01)

(58) Field of Classification Search
CPC ............ H04W 72/042; H04W 72/046; H04W 72/1273; H04W 72/1289; H04W 88/085
USPC ........................................................ 370/329
See application file for complete search history.

(56) References Cited

U.S. PATENT DOCUMENTS

| | | | |
|---|---|---|---|
| 2011/0064115 A1* | 3/2011 | Xu .................... | H05K 999/99 375/130 |
| 2016/0119969 A1 | 4/2016 | Vajapeyam et al. | |
| 2016/0345199 A1* | 11/2016 | Nogami ............... | H04W 76/27 |
| 2017/0118745 A1* | 4/2017 | Nogami ............... | H04W 72/0406 |
| 2018/0042016 A1* | 2/2018 | Babaei ................ | H04W 72/1289 |
| 2018/0049073 A1* | 2/2018 | Dinan ................. | H04W 72/1257 |
| 2018/0070337 A1* | 3/2018 | Park ................... | H04L 5/0091 |
| 2018/0092122 A1* | 3/2018 | Babaei ................ | H04W 72/14 |
| 2018/0302886 A1* | 10/2018 | Pan .................... | H04W 72/0406 |
| 2019/0245657 A1* | 8/2019 | Lee .................... | H04L 1/1835 |
| 2019/0320420 A1* | 10/2019 | Zhang ................. | H04L 5/0094 |
| 2019/0320469 A1* | 10/2019 | Huang ................. | H04L 5/0053 |
| 2019/0394794 A1* | 12/2019 | Mali ................... | H04W 74/0833 |

OTHER PUBLICATIONS

Huawei et al., "Higher Layer Implications of NC-JT Transmission from Multiple TRPs", 3GPP Draft; R1-1706980, 3rd Generation Partnership Project (3GPP), Mobile Competence Centre; 650, Route Des Lucioles; F-06921 Sophia-Antipolis Cedex; France, vol. RAN WG1, No. Hangzhou, China; May 15, 2017-May 19, 2017, May 14, 2017 (May 14, 2017), XP051272210, 2 Pages, section 2.
International Search Report and Written Opinion—PCT/US2019/045937—ISA/EPO—dated Oct. 22, 2019.

(Continued)

*Primary Examiner* — Robert J Lopata
(74) *Attorney, Agent, or Firm* — Qualcomm Incorporated

(57) ABSTRACT

Wireless communications systems and methods related to serving user equipment devices (UEs) using downlink (DL) semi-persistent scheduling (SPS) in a multi-transmission/reception point (multi-TRP) environment.

33 Claims, 8 Drawing Sheets

(56) References Cited

OTHER PUBLICATIONS

Samsung Electronics R&D Institute UK: "Considerations of the Number of SPS Configurations per cell Group and TP for TS 38.321v1.0.0", R2-1710335 Considerations of the Number of SPS Configurations Per Cell Group and TP for TS 38.321V1.0.0, 3rd Generation Partnership Project, Mobile Competence Centre; 650, Route De, vol. RAN WG2, No. Prague, Czech Republic; Oct. 9, 2017-Oct. 13, 2017, Oct. 8, 2017, XP051342383, 3 Pages, Sections "Introduction" and "Number of SPS configurations per cell group".
ZTE: "Consideration on SPS", 3GPP TSG-RAN WG2 Meeting #98, 3GPP Draft, R2-1704698 Consideration on SPS, 3rd Generation Partnership Project (3GPP), Mobile Competence Centre, 650, Route Des Lucioles, F-06921 Sophia Antipolis Cedex, France, vol. RAN WG2, No. Hangzhou, China, May 15, 2017-May 19, 2017, May 5, 2017 (May 5, 2017), XP051263869, 5 Pages, p. 3, Line 16-p. 4, Line 11, Section "Multiple SPS configuration".

* cited by examiner

SPS SUPPORT FOR MULTI-TRP

This application claims the benefit of U.S. Provisional Application Ser. No. 62/717,680, entitled "SPS SUPPORT FOR MULTI-TRP" filed on Aug. 10, 2018 which is expressly incorporated by reference herein in its entirety.

TECHNICAL FIELD

This application relates to wireless communication systems, and more particularly to semi-persistent scheduling (SPS) of downlink (DL) communications in a multi-transmission/reception point (TRP) environment.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum. NR further introduces multi-TRP techniques to improve link reliability and throughput.

For example, an NR network may operate over a licensed frequency band, an unlicensed frequency band, and/or a shared frequency band. The network may include multiple TRPs deployed at various geographical locations. The TRPs may be communicatively coupled to multiple BSs of the network. The TRPs may be associated with one or more cells. The TRPs may directly communicate with UEs in the network over the air. For multi-TRP transmissions, the network may form clusters of TRPs to serve UEs. For example, one or more BSs may coordinate with each other to schedule a cluster of TRPs to serve a downlink transmission to a UE. The dynamic behaviors of radio conditions, spectrum utilization, and/or traffic loading, UE-mobility, and/or regulations for spectrum sharing can cause various challenges for multi-TRP-based communications.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the invention, a UE receives at least one downlink (DL) semi-persistent scheduling (SPS) configuration information, including DL SPS configurations for multiple transmissions reception points (TRP); receives downlink control information (DCI); activates at least one DL SPS configuration based on the received DCI; and receiving DL communications in accordance with the activated DL SPS configuration.

In another aspect, a UE receives at least one DL SPS configuration including parameters for at least two TRPs; receives downlink control information (DCI); activates at least one DL SPS configuration based on the received DCI; and receiving DL communications in accordance with the activated DL SPS configuration.

In an aspect, a UE receives at least one DL SPS configuration including parameters for at least two TRPs; receives downlink control information (DCI); activates at least one DL SPS configuration based on the received DCI, wherein the activated DL SPS configuration configures the first and second TRPs such that all their DL SPS scheduled transmissions overlap in time; and receiving DL communications in accordance with the activated DL SPS configuration.

In an aspect, a UE receives at least one DL SPS configuration including parameters for at least two TRPs; receives downlink control information (DCI); activates at least one DL SPS configuration based on the received DCI, wherein the activated DL SPS configuration configures the first and second TRPs such that none of their DL SPS scheduled transmissions overlap in time; and receiving DL communications in accordance with the activated DL SPS configuration.

In another aspect, a UE receives at least one DL SPS configuration including parameters for at least two TRPs; receives downlink control information (DCI); activates at least one DL SPS configuration, including parameters for at least two TRPs, based on the received DCI; and receiving DL communications in accordance with the activated DL SPS configuration.

In an aspect, a UE receives at least one DL SPS configuration including parameters for at least two TRPs; receives downlink control information (DCI), including activation information of the DL SPS configuration indicating a selection of TRPs in the DL SPS transmission; activates at least one DL SPS configuration based on the received DCI; and receiving DL communications in accordance with the activated DL SPS configuration. In another aspect, each DL SPS configuration may correspond with a set of TCI combinations; and each DCI may corresponds with a particular TCI combination.

In an aspect, a UE receives a plurality of DL SPS configurations, each including parameters for at least two TRPs; receives downlink control information (DCI); activates at least one DL SPS configuration based on the received DCI; and receiving DL communications in accordance with the activated DL SPS configuration. In another aspect, the UE may select one of the received plurality of DL SPS configurations and activate the selected DL SPS configuration.

In an aspect, a UE receives first DL SPS configuration information for a first TRP and second DL SPS configuration information for a second TRP; receives downlink control information (DCI); activates at least one DL SPS configuration based on the received DCI; and receiving DL communications in accordance with the activated DL SPS configuration.

In an aspect, a UE receives first DL SPS configuration information for a first TRP, the first DL SPS configuration configuring at least one transmission from the first TRP; receives second DL SPS configuration information for a second TRP, and the second DL SPS configuration configuring at least one transmission from the second TRP; receives downlink control information (DCI); activates at least one DL SPS configuration based on the received DCI; and receiving DL communications in accordance with the activated DL SPS configuration. In another aspect, the configured transmissions from the first TRP and the second TRP always overlap in time. In yet another aspect, the configured transmissions from the first TRP and the second TRP never overlap in time.

In an aspect, a UE receives first DL SPS configuration information for a first TRP and second DL SPS configuration information for a second TRP; receives a first DCI including activation information for the first DL SPS configuration; receives a second DCI including activation information for the second DL SPS configuration; activates the first and second DL SPS configurations based on the received first and second DCIs; and receiving DL communications in accordance with the activated DL SPS configuration. In another aspect, each DL SPS configuration may correspond with a first TCI or QCL; and each DCI may corresponds with a DL SPS configuration.

In an aspect, a UE receives first DL SPS configuration information for a first TRP and second DL SPS configuration information for a second TRP; receives DCI including activation information for both the first DL SPS configuration and the second DL SPS configuration; activates the first and second DL SPS configurations based on the received DCI; and receiving DL communications in accordance with the activated DL SPS configuration. In another aspect, each DL SPS configuration may correspond with a first TCI or QCL; and each DCI may correspond with a second TCI or QCL.

In an aspect, a UE may include a transceiver, a memory, and a processor; the memory including program code for causing the processor to communicate via the transceiver in accordance with any of the preceeding aspects.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
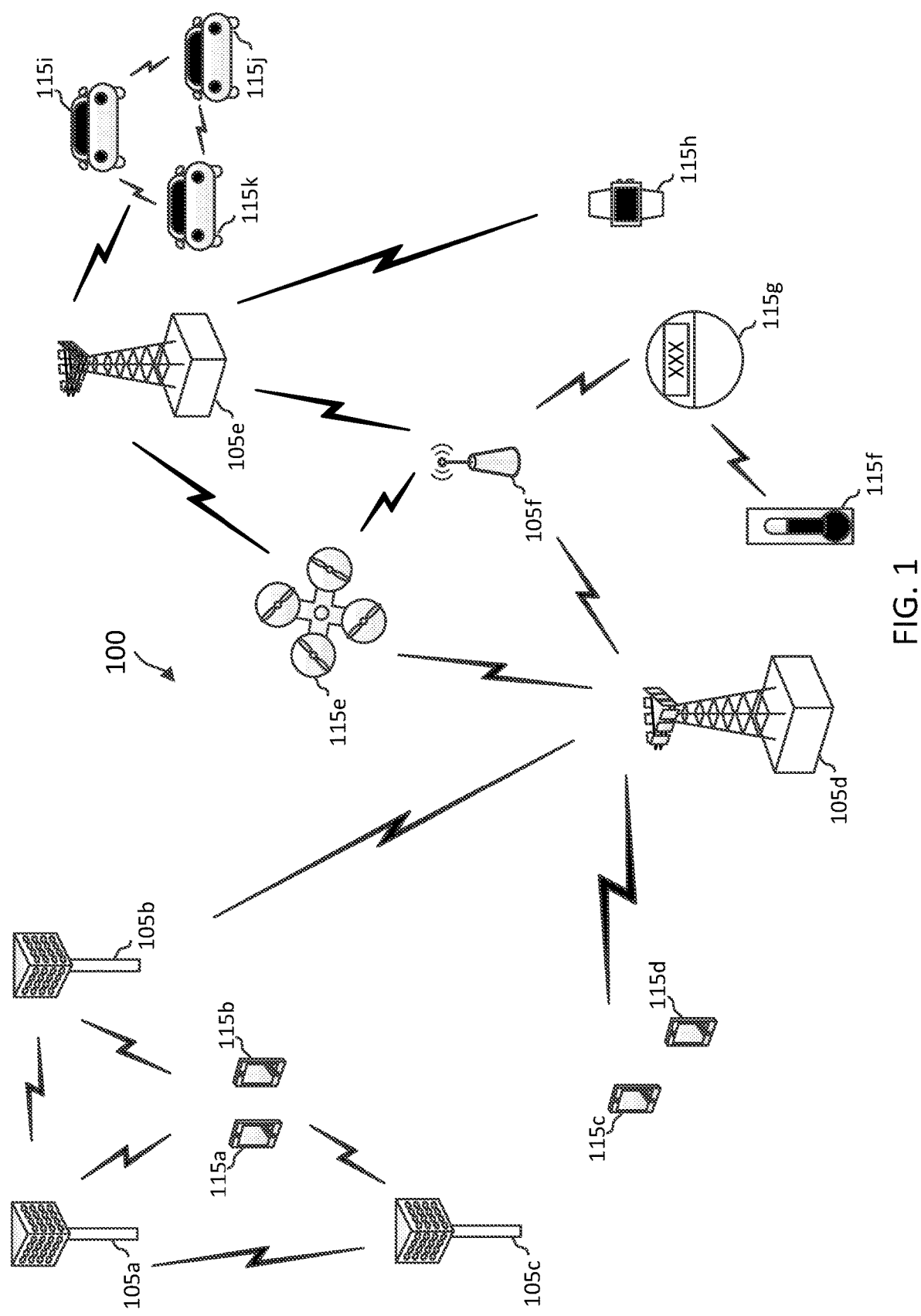
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/$km^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like BW. For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting.

Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

As described above, a network may employ multi-TRP communication techniques to improve link reliability and throughput. For example, the network may form clusters of transmission/reception points (TRPs) to serve UEs in the network. For example, a UE may be served by a cluster of TRPs at any given time, where the TRPs in the cluster may be associated with one or more BSs and/or one or more cell in the network. To optimize system performance, the clustering of TRPs may change over time to adapt to varying radio conditions, spectrum utilization, and/or traffic loading, UE-mobility, and/or regulations for spectrum sharing. As such, a UE may be served by different clusters of TRPs at different time periods. In some instances, the different serving TRP clusters may have different number of TRPs.

The present application describes mechanisms for serving UEs using dynamic varying TRP clusters. For example, a UE may be served by a first group of TRPs during a first time period. Subsequently, the UE may be served by a second group of TRPs during a second time period. The second group may include at least one TRP that is not in the first group. The second group may be formed by adding an additional TRP to the first group and/or removing a TRP from the first group. The TRPs in the first group and/or the second group may be associated with one or more BSs and/or one or more cells. The BSs may coordinate with each other to form and schedule serving TRP clusters. In the disclosed embodiments, the network may define a data transmission grid in time and may schedule transmissions based on the grid. The data transmission grid may be common and known to all BSs and/or all TRPs in coordination. In some instances, the grid may uniformly time-partitioned a timeline into time intervals of equal durations. In some other instances, the grid may non-uniformly time-partitioned a timeline into time intervals of different durations.

In an embodiment, the network may schedule a transport block (TB) in each time grid (e.g. each time interval). The network may change a serving TRP cluster at boundaries of the grid. In other words, a serving TRP cluster may remain the same for the duration of the TB. To allow for scheduling flexibility, the grid may be defined to include a fine time granularity (e.g., of a few symbols).

In an embodiment, the network may schedule a TB across multiple grids. The network may change a serving TRP cluster any time. Thus, a UE may receive a portion of a TB from one TRP cluster and another portion of the TB from another TRP cluster. In such an embodiment, a scheduling grant may include scheduling information, such as a transmission duration or time span and/or a modulation coding scheme (MCS) for each TB portion. In addition, the scheduling grant may provide reference signal information (e.g., reference signal indications and/or quasi-co-location (QCL)

indications with respect to antenna ports and/or channel estimation) associated with the TB portions to allow for improved channel estimation performance at UEs.

FIG. 1 illustrates a wireless communication network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100 A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource configuration (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In an embodiment, the network 100 may operate over a shared channel, which may include a shared frequency bands or an unlicensed frequency band, for example, at about 3.5 gigahertz (GHz), sub-6 GHz or higher frequencies in the mmWav band. In such an embodiment, the B Ss 105 and the UEs 115 may be operated by multiple network operating entities. To avoid collisions, the BSs 105 and the UEs 115 may employ a listen-before-talk (LBT) procedure to monitor for transmission opportunity (TXOP) in the shared channel. For example, a BS 105 may perform an LBT in the shared channel. When the LBT passes, the BS 105 may schedule a UE 115 for communications over the shared channel during the TXOP.

In an embodiment, the network 100 may support multi-TRP transmissions over a licensed band, an unlicensed band, or a shared frequency band. For multi-TRP transmissions, a BS 105 may be communicatively coupled to one or more TRPs. TRPs of one or more BSs 105 and/or one or more cells may form a cluster to serve a UE 115. The TRPs may also be referred to as radio heads. The TRPs may implement at least some radio frequency (RF) functionalities for over-the-air communications with the UEs 115. The BSs 105 may coordinate with each other to schedule a cluster TRPs to communicate with a UE 115. In an embodiment, a UE 115 may be served by dynamic varying TRP clusters. For example, a UE 115 may be served by different TRP clusters at different time, where different TRP clusters may include different sets or groups of TRPs. In an embodiment, a UE 115 may receive one TB from one TRP cluster during a time period and receive another TB from another TRP cluster during another period. In an embodiment, a UE 115 may receive a portion of a TB from one TRP cluster and another portion of the TB from another TRP cluster. Mechanisms for serving UEs 115 using dynamic varying TRP cluster are described in greater detail herein.

Figure 2:
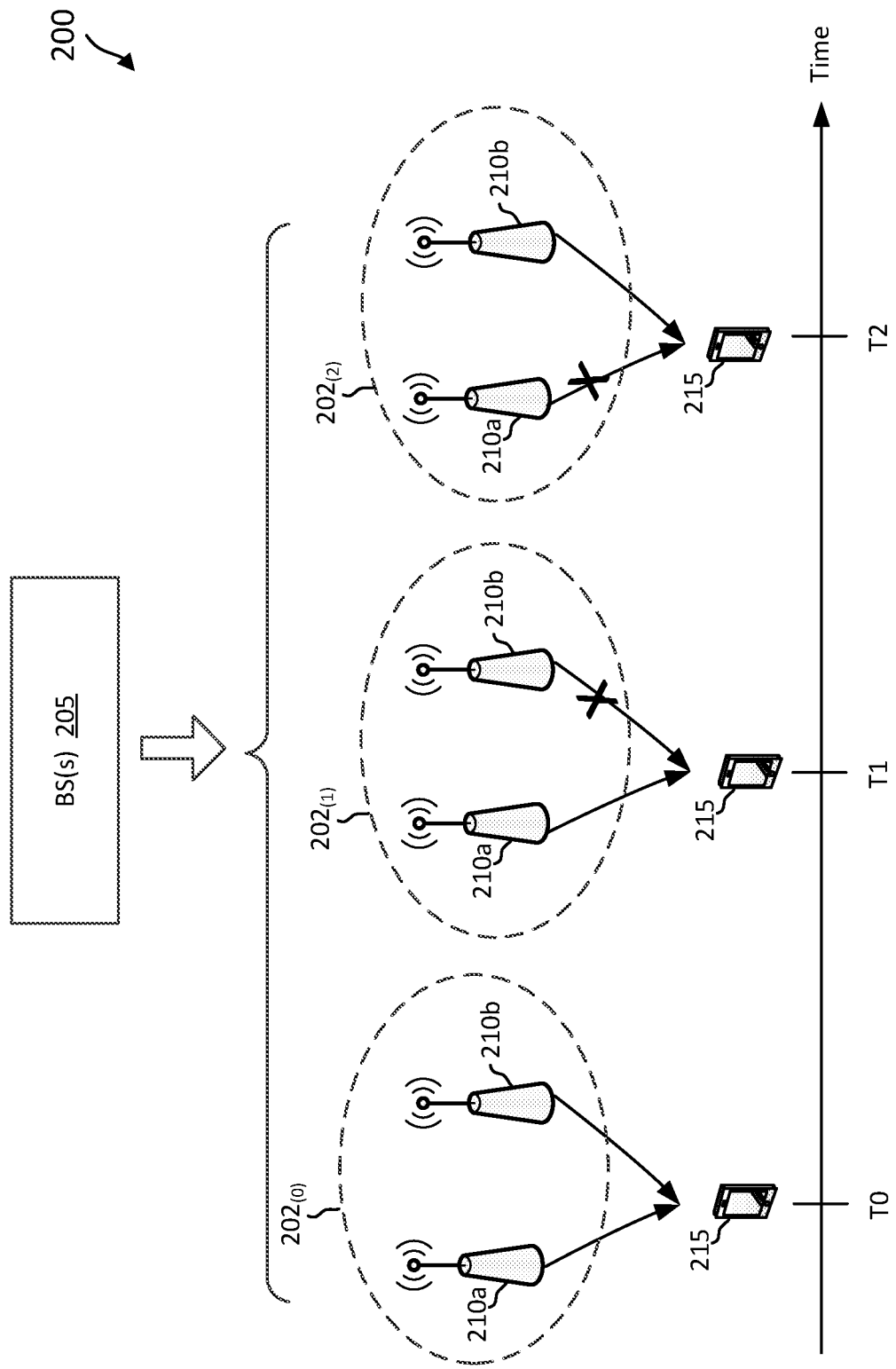
FIG. 2 illustrates a multi-transmission/reception point (multi-TRP) transmission scenario according to some embodiments of the present disclosure.

FIG. 2 illustrates a multi-TRP transmission scenario 200 according to some embodiments of the present disclosure. The scenario 200 may correspond to a multi-TRP transmission scenario in the network 100. In FIG. 2, the x-axis represents time in some constant units. FIG. 2 illustrates TRP clusters 202 formed from one or two TRPs 210 for purposes of simplicity of discussion, though it will be recognized that embodiments of the present disclosure may scale to include any suitable number of TRPs 210 (e.g., about 3, 4 or more) in a TRP cluster. The TRPs 210 are shown 210a and 210b. The TRPs 210 may be associated with one or more BSs 205 (e.g., the BSs 105). The BSs 205 may be associated with one or more cells. The BSs 205 with the distributed TRPs 210 can also be referred to as network units.

In one embodiment, the TRP 210a and the TRP 210b may be communicatively coupled to the same BS 205. The TRP 210a and/or the TRP 210b may be co-located with the BS 205. Alternatively, the TRP 210a and/or the TRP 210b may be remote TRPs located at a different geographical location than the BS 205. The remote TRPs 210a and 210b may communicate with the BS wirelessly or via a wired connection (e.g., an optical link).

In another embodiment, the TRP 210a and the TRP 210b may be communicatively coupled to different BSs and/or associated with different cells.

At time T0, one or more BSs 205 may coordinate with each other to form a TRP cluster $202_{(0)}$ to serve a UE 215 (e.g., the UEs 115). The TRP cluster $202_{(0)}$ includes two TRPs 210 (e.g., shown as TRP 210a and TRP 210b).

In an embodiment, the TRPs 210a and 210b may simultaneously transmit the same TB in different spatial layers to the UE 215. For example, the UE 215 may receive a single scheduling grant (e.g., downlink control information (DCI)) for a DL communication of a TB, where different spatial layers may be transmitted from different TRPs 210. A TB may correspond to a packet data unit (PDU) of a medium access control (MAC) layer packet data unit (PDU). A TB is passed from the MAC layer to a physical layer for transmission during a transmission time interval (TTI). The physical layer may encode and modulate the data in the PDU for transmission.

In another embodiment, the TRPs 210a and 210b may simultaneously transmit different TB s to the UE 115. For example, the UE 215 may receive multiple scheduling grants, each granting a DL communication of a TB, where each TB may be transmitted from one TRP 210.

At time T1, one or more BSs 205 may coordinate with each other to form a TRP cluster $202_{(1)}$ to serve the UE 215. The TRP cluster $202_{(1)}$ is updated from the TRP cluster $202_{(0)}$ to exclude of the TRP 210b as shown by the cross. The exclusion of the TRP 210b may occur due to various factors. In one embodiment, the TRP 210b may need to serve another UE (e.g., the UEs 115 and 215) requiring a boosted power spectral density (PSD) at time T1, and thus the TRP 210b may not be able to serve the UE 215.

In another embodiment, the TRPs 210a and 210b may serve the UE 215 over an unlicensed spectrum or a shared spectrum and the TRP 210b may fail to gain access (e.g., a failed LBT) to the spectrum at time T1. Alternatively, the TRP 210b may refrain from transmitting in the spectrum in order to meet a certain regulation (e.g., a frame based equipment (FBE) regulation) for the spectrum.

At time T2, one or more BSs 205 may coordinate with each other to form a TRP cluster $202_{(2)}$ to serve the UE 215. The TRP cluster $202_{(2)}$ is updated from the TRP cluster $202_{(1)}$ by including the TRP 210b and excluding the TRP 210a as shown by the cross. For example, at time T2, the TRP 210b can return to serve the UE 215, but the TRP 210a may not be able to serve the UE 215 due to similar reasons as described above.

As can be seen from the scenario 200, a UE may be served by dynamic varying TRP clusters 202, where the number of TRPs 210 in the clusters may change or the serving TRPs 210 in the clusters may change. Mechanisms for scheduling with dynamic varying TRP cluster are described in greater detail herein.

Figure 3:
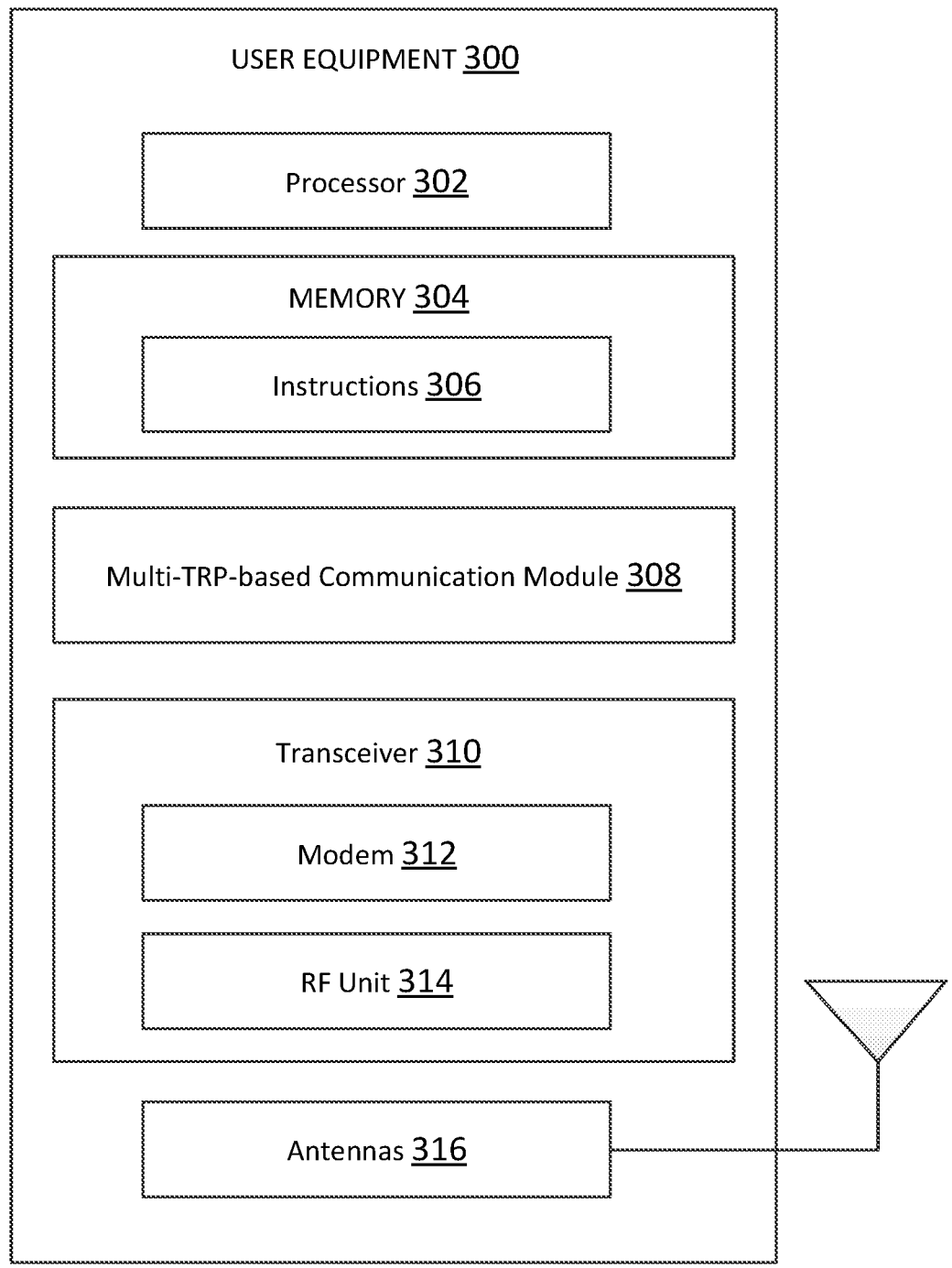
FIG. 3 is a block diagram of an exemplary user equipment (UE) according to embodiments of the present disclosure.

FIG. 3 is a block diagram of an exemplary UE 300 according to embodiments of the present disclosure. The UE 300 may be a UE 115 or 215 as discussed above. As shown, the UE 300 may include a processor 302, a memory 304, a multi-TRP-based communication module 308, a transceiver 310 including a modem subsystem 312 and a radio frequency (RF) unit 314, and one or more antennas 316. These elements may be in direct or indirect communication with each other, for example via one or more buses.

The processor 302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the UEs 115 in connection with embodiments of the present disclosure. Instructions 306 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The multi-TRP-based communication module 308 may be implemented via hardware, software, or combinations thereof. For example, the multi-TRP-based communication module 308 may be implemented as a processor, circuit, and/or instructions 306 stored in the memory 304 and executed by the processor 302. The multi-TRP-based communication module 308 may be used for various aspects of the present disclosure. For example, the multi-TRP-based communication module 308 is configured to receive scheduling grants determined by one or more BSs (e.g., the BS 105 and 205), receive different TBs from different clusters (e.g., TRP clusters 202) of TRPs (e.g., the TRPs 210), receive different portions of a TB from different TRP clusters, and/or transmit acknowledgement/not-acknowledgement (A/N) feedbacks per code block group (CBG), as described in greater detail herein.

As shown, the transceiver 310 may include the modem subsystem 312 and the RF unit 314. The transceiver 310 can be configured to communicate bi-directionally with other devices, such as the BSs 105 and 205. The modem subsystem 312 may be configured to modulate and/or encode the data from the memory 304, and/or multi-TRP-based communication module 308 according to a modulation and coding scheme (MCS), e.g., a low-density parity check (LDPC) coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115, a BS 105, or a TRP 210. The RF unit 314 may be further configured to perform analog beamforming in conjunction with the digital beamforming. Although shown as integrated together in transceiver 310, the modem subsystem 312 and the RF unit 314 may be separate devices that are coupled together at the UE 115 to enable the UE 115 to communicate with other devices.

The RF unit 314 may provide the modulated and/or processed data, e.g. data packets (or, more generally, data messages that may contain one or more data packets and other information), to the antennas 316 for transmission to one or more other devices. The antennas 316 may further receive data messages transmitted from other devices. The antennas 316 may provide the received data messages for processing and/or demodulation at the transceiver 310. The antennas 316 may include multiple antennas of similar or different designs in order to sustain multiple transmission links. The RF unit 314 may configure the antennas 316.

Figure 4:
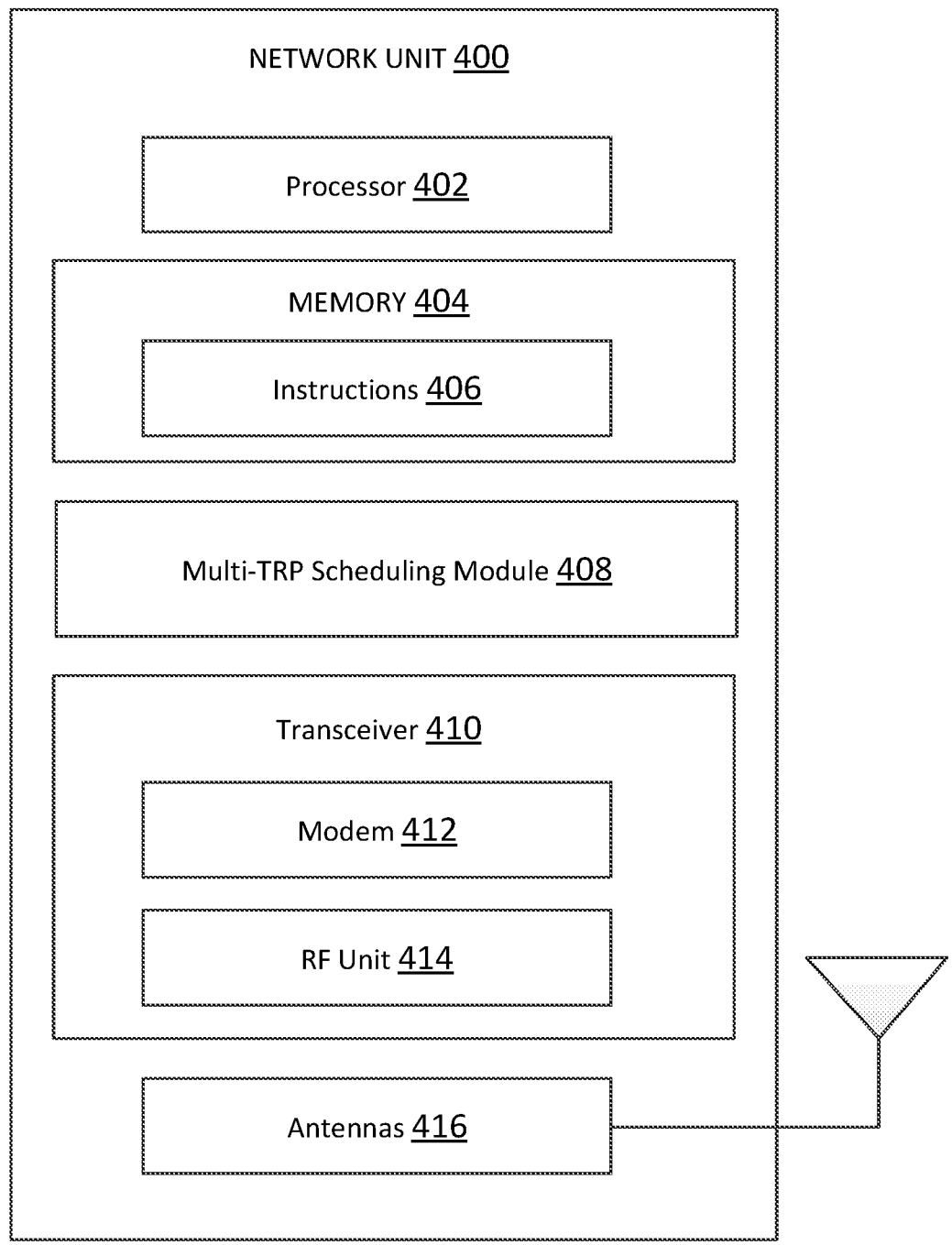
FIG. 4 is a block diagram of an exemplary base station (BS) according to embodiments of the present disclosure.

FIG. 4 is a block diagram of an exemplary BS 400 according to embodiments of the present disclosure. The BS 400 may be a BS 105 or 205 as discussed above. A shown, the BS 400 may include a processor 402, a memory 404, a multi-TRP scheduling module 408, a transceiver 410 including a modem subsystem 412 and a RF unit 414, and one or more antennas 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 404 may include a non-transitory computer-readable medium. The memory 404 may store instructions 406. The instructions 406 may include instructions that, when executed by the processor 402, cause the processor 402 to perform operations described herein. Instructions 406 may also be referred to as code, which may be interpreted broadly to include any type of computer-readable statement(s) as discussed above with respect to FIG. 4.

The multi-TRP scheduling module 408 may be implemented via hardware, software, or combinations thereof. For example, the multi-TRP scheduling module 408 may be implemented as a processor, circuit, and/or instructions 406 stored in the memory 404 and executed by the processor 402. The multi-TRP scheduling module 408 may be used for various aspects of the present disclosure. For example, the multi-TRP scheduling module 408 is configured to coordinate scheduling for multiple TRPs (e.g., the TRPs 210) associated with one or more BSs (e.g., the BSs 105, 205, and 400) and/or one or more cells, determine a data transmission time grid (e.g., a PDSCH time grid), schedule communications of TBs based on the data transmission time grid (e.g., one TB per grid or one TB per multiple grids), and/or dynamically switching TRP clusters (e.g., the TRP clusters 202) for communications of TBs (e.g., at grid boundaries or at any time), as described in greater detail herein.

As shown, the transceiver 410 may include the modem subsystem 312 and the RF unit 414. The transceiver 410 can be configured to communicate bi-directionally with other devices, such as the UEs 115 and/or another core network element. The modem subsystem 312 may be configured to modulate and/or encode data according to a MCS, e.g., a LDPC coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or 300. The RF unit 414 may be further configured to perform analog beamforming in conjunction with the digital beamforming. Although shown as integrated together in transceiver 410, the modem subsystem 412 and/or the RF unit 414 may be separate devices that are coupled together at the BS 105 to enable the BS 105 to communicate with other devices.

The RF unit 414 may provide the modulated and/or processed data, e.g. data packets (or, more generally, data messages that may contain one or more data packets and other information), to the antennas 416 for transmission to one or more other devices. This may include, for example, transmission of information to complete attachment to a network and communication with a camped UE 115 or 300 according to embodiments of the present disclosure. The antennas 416 may further receive data messages transmitted from other devices and provide the received data messages for processing and/or demodulation at the transceiver 410. The antennas 416 may include multiple antennas of similar or different designs in order to sustain multiple transmission links.

In an embodiment, the RF unit 414 and the antennas 416 may be implemented as one or more TRPs (e.g., the TRPs 210). The BS 400 may be communicatively coupled to the TRPs, for example, via a wireless link (e.g., fronthaul) or a wired link (e.g., an optical link). In some instances, the TRPs can be co-located with the BS 400. In some other instances, the TRPs can be located at remote locations away from the BS 400.

Figure 5:
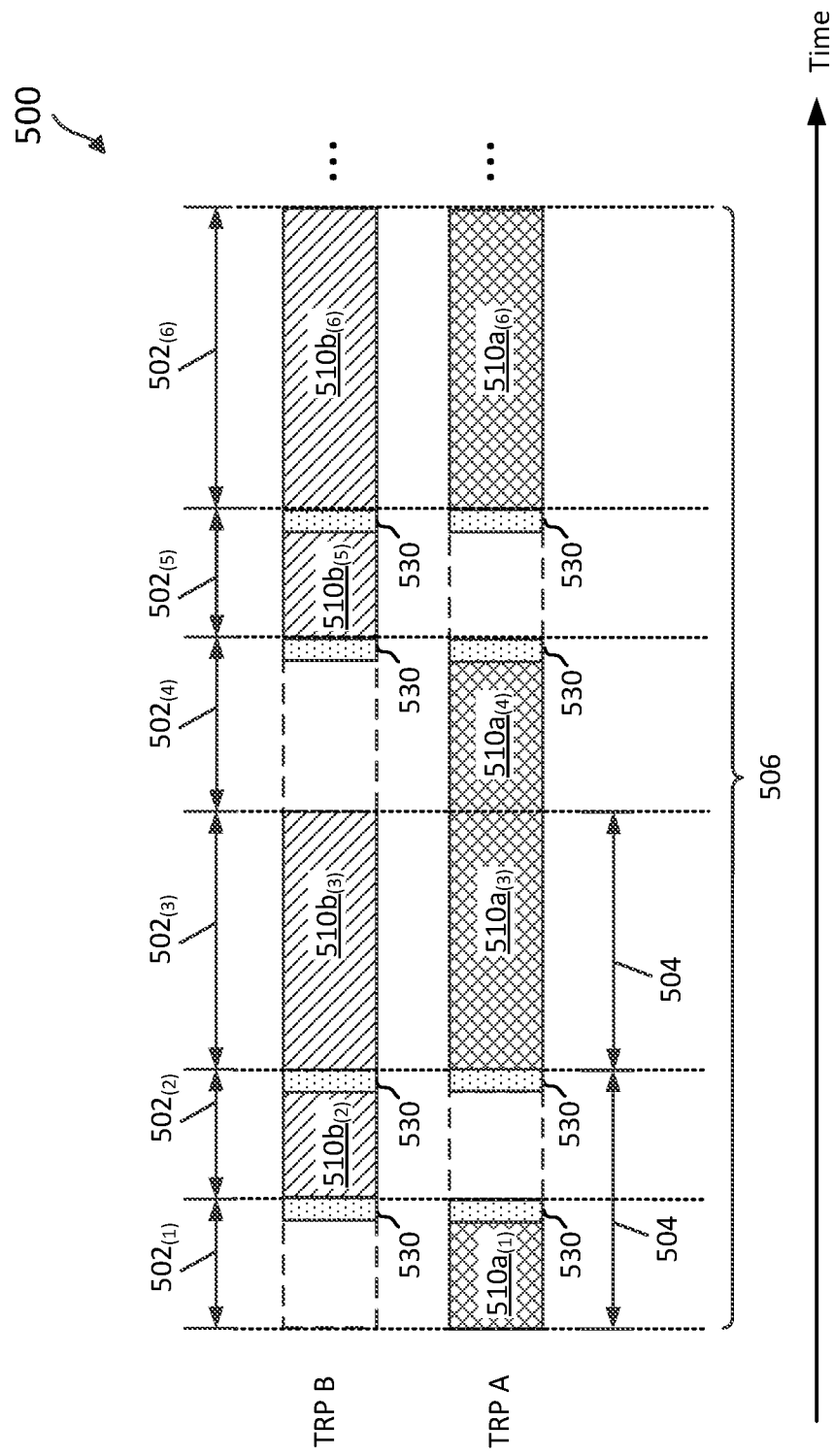
FIG. 5 illustrates a multi-TRP scheduling scheme according to some embodiments of the present disclosure.
Figure 6:
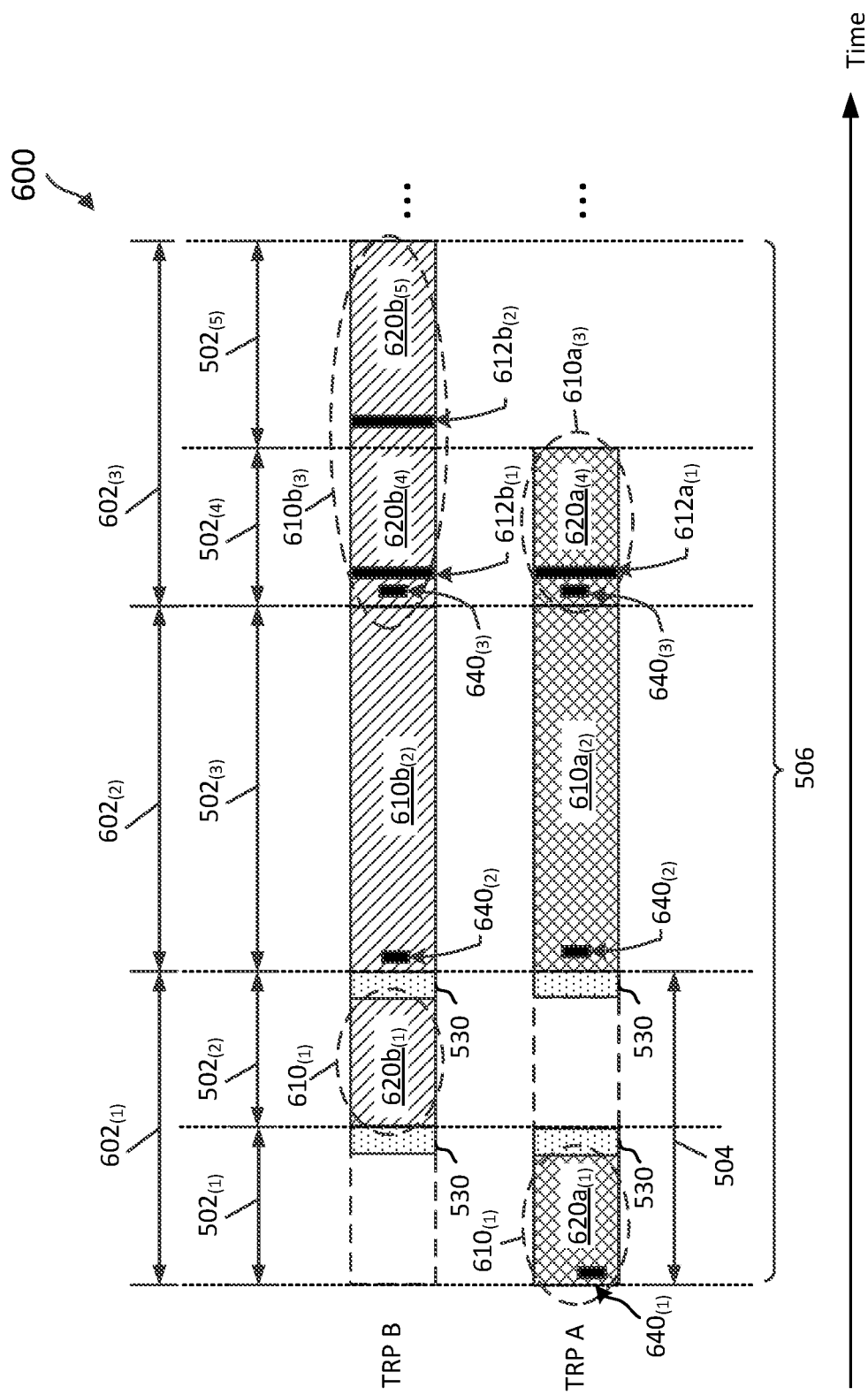
FIG. 6 illustrates a multi-TRP scheduling scheme according to some embodiments of the present disclosure.

FIGS. 5-7 illustrate various mechanisms for operating in a network such as the network 100 that supports multi-TRP communications, for example, as shown in the scenario 200. In FIGS. 5-7, the x-axes represent time in some constant units.

FIG. 5 illustrates a multi-TRP scheduling scheme 500 according to some embodiments of the present disclosure. The scheme 500 may be employed by a network such as the network 100. In particular, one or more BSs such as the BSs 105, 205, and 400 may employ the scheme 500 to schedule serving TRP clusters (e.g., the TRP clusters 202) to communicate with a UE such as the UEs 115, 215, and 300. The scheme 500 schedules TBs based on a PDSCH grid 506. The PDSCH grid 506 partitions a timeline into a plurality of time periods 502. The time periods 502 are shown as $502_{(1)}$ to $502_{(6)}$. In some embodiments, the time periods 502 may have the same duration. In some other embodiments, the time periods 502 may have different time durations. Each time period 502 may include one or more OFDM symbols, spanning a portion of a transmission slot 504 or an entire transmission slot 504. The PDSCH grid 506 may be a predetermined grid known to all associated BSs and/or TRPs in coordination for multi-TRP transmissions.

In the scheme 500, the network (e.g., one or more BSs in coordination or a network unit in communications with one or more BSs) may schedule TBs aligned to the PDSCH grid 506. For example, the network may schedule one TB 510 per grid or per time period 502. The network may change serving TRP clusters at boundaries of the PDSCH grid 506. In other words, a serving TRP cluster may not vary while the transmission of the TB is in progress. For simplicity of discussion, the scheme 500 is illustrated using TRP clusters including one TRP (e.g., a TRP A or a TRP B) or two TRPs (e.g., a TRP A and a TRP B). However, the scheme 500 may be applied to schedule TRP clusters with any suitable number of TRPs (e.g., about 3, 4 or more). The TRP A and the TRP B may be similar to the TRPs 210. The TRP A and the TRP B may be associated with the same BS or different BSs. For example, when the TRP A and the TRP B are associated with different BSs, the BSs may coordinate with each other to schedule a UE for communication.

As shown in FIG. 5, a network (e.g., one or more BSs in coordination) may schedule a first TRP cluster including a TRP A (e.g., the TRP 210a) to serve a UE in a time period $502_{(1)}$. For example, the TRP A may transmit a TB $510a_{(1)}$ to the UE. Subsequently, the network may schedule a second TRP cluster including a TRP B (e.g., the TRP 210b) to serve the UE in a time period $502_{(2)}$. In other words, the network may remove the TRP A from the first TRP cluster and may add the TRP B to form the second TRP cluster. For example, the TRP B may transmit a TB $510b_{(2)}$ to the UE during the time period $502_{(2)}$. The dashed boxes may represent channel idles.

The network may further schedule a third TRP cluster including the TRP A and the TRP B to serve the UE in a time period $502_{(3)}$. In other words, the network may add the TRP B to the second TRP cluster. For example, the TRP A and the TRP B may simultaneously transmit a TB $510a_{(3)}$ and a TB $510b_{(3)}$, respectively, to the UE during the time period $502_{(3)}$. In some instances, the TBs $510a_{(3)}$ and $510b_{(3)}$ may correspond to the same TB at all scheduled layers. In some other instances, the TBs $510a_{(3)}$ and $510b_{(3)}$ may correspond to the same TB at different spatial layers. In yet some other instances, the TBs $510a_{(3)}$ and $510b_{(3)}$ may be different TBs.

Subsequently, the network may further schedule the first TRP cluster including the TRP A to communicate a TB $510a_{(4)}$ with a UE during a time period $502_{(4)}$. The network may further schedule the second TRP cluster including the TRP B to communicate a TB $510b_{(5)}$ with the UE during a time period $502_{(5)}$. The network may further schedule the third TRP cluster including TRP A and the TRP B to simultaneously communicate a TB $510a_{(6)}$ and a TB $510b_{(6)}$, respectively, with the UE during a time period $502_{(6)}$.

In an embodiment, to allow for faster switching of serving TRP clusters (e.g., to remove a TRP, to add a TRP, or to change a TRP in a cluster), the scheme 500 may define the PDSCH grid 506 with a finer time granularity. For example, the scheme 500 may configure the PDSCH grid 506 to have a finer granularity in time than a transmission slot 504 (e.g., including about 7 OFDM symbols). As shown, a transmission slot 504 may be time-partitioned into a time periods $502_{(1)}$ and a time period $502_{(2)}$. While a finer PDSCH grid 506 may provide more scheduling flexibility, the overheads associated with additional reference signals (e.g., demodulation reference signals (DMRSs)) and/or scheduling grants may increase. For example, each PDSCH grid or time period 502 may include resource allocations for a DMRS and a scheduling grant to facilitate the reception and decoding of a TB 510 at the UE.

In an embodiment, when a TRP cluster includes a single TRP, the TRP may relinquish a transmission at an earlier time before the end of a corresponding time period 502 in the PDSCH grid 506. For example, the TRP A scheduled to transmit in the time period $502_{(1)}$ may complete the transmissions of the TB $510a_{(1)}$ before the end of the time period $502_{(1)}$. Conversely, the cluster with both the TRP A and the TRP B scheduled to transmit in the time period $502_{(3)}$ may each occupy the channel in the entire time period $502_{(3)}$.

In an embodiment, the scheme 500 may be employed by a network operating over a shared frequency band or an unlicensed band, where an LBT 530 may be performed prior to each transmission. As shown, the PDSCH grid 506 includes time for the LBTs 530. While FIG. 5 illustrates an LBT period at the end of each time period 502, the PDSCH grid 506 may be alternatively configured to include a period for an LBT 530 at beginning of each time period 502.

As can be seen in the scheme 500, a serving TRP cluster may not vary during the transmission of a TB. To change a serving TRP cluster, the network may wait till the end of a time period 502 and schedule a different serving TRP cluster for a next scheduling time period 502. By maintaining the same TRPs in a serving TRP cluster across the transmission of a TB, the UE may be able to perform channel estimation with less complexity, for example, without considering different channel conditions with different groups of TRPs.

FIG. 6 illustrates a multi-TRP scheduling scheme 600 according to some embodiments of the present disclosure. The scheme 600 may be employed by a network such as the network 100. In particular, one or more BSs such as the BSs 105, 205, and 400 may employ the scheme 600 to schedule TRP clusters (e.g., the TRP clusters 202) to communicate with a UE such as the UEs 115, 215, and 300. The scheme 600 may be substantially similar to the scheme 500. For example, the scheme 600 may use a PDSCH grid similar to the PDSCH grid 506 in the scheme 500 described with respect to FIG. 5 for scheduling. However, the scheme 600 may schedule a TB across one or more PDSCH grids (e.g., the time periods 502) instead of aligned to the PDSCH grid 506. In addition, the scheme 600 may vary a serving TRP cluster within the transmission duration of a TB.

As shown, a network (e.g., one or more BSs in coordination) may schedule a communication of a TB $610_{(1)}$ with a UE across two time periods 502 or two PDSCH grids 506 (e.g., in a time period $602_{(1)}$). The TB $610_{(1)}$ may include two portions, a portion $620a_{(1)}$ and a portion $620b_{(1)}$. The network may schedule a first TRP cluster (e.g., the TRP clusters 202) including a TRP A (e.g., the TRP 210a) to serve the TB portion $620a_{(1)}$ to the UE. The network may schedule a second TRP cluster including a TRP B (e.g., the TRP 210b) to serve the TB portion $620b_{(1)}$ to the UE.

The network may further schedule a third TRP cluster including the TRP A and the TRP B to serve the UE in a time period $602_{(2)}$. For example, the TRP A and the TRP B may simultaneously transmit a TB $610a_{(2)}$ and a TB $610b_{(2)}$, respectively, to the UE during the time period $602_{(2)}$. Similar to the scheme 500, the TBs $610a_{(2)}$ and $610b_{(2)}$ may correspond to the same TB at all scheduled layer. Alternatively, the TBs $610a_{(2)}$ and $610b_{(2)}$ may correspond to the same TB at different spatial layers. Yet alternatively, the TBs $610a_{(2)}$ and $610b_{(2)}$ may correspond to different, independent TBs.

Subsequently, the network may schedule a communication of a TB $610a_{(3)}$ and a TB $610a_{(3)}$ with a UE in a time period $602_{(3)}$ spanning two time periods 502 or two PDSCH grids 506. The network may continue to schedule the same third TRP cluster to serve the UE in the time period $502_{(4)}$ and switch to schedule the second TRP cluster (e.g., TRP B) to serve the UE in the time period $502_{(5)}$. As shown, the TRP A and the TRP B may simultaneously transmit a first portion $620b_{(4)}$ of a TB $610a_{(3)}$ and a first portion $620a_{(4)}$ of a TB $610b_{(3)}$, respectively, to the UE in the time period $502_{(4)}$. The TRP B continues to transmit a second portion $620b_{(5)}$ of the TB $610b_{(3)}$ to the UE in the time period $502_{(5)}$, whereas the TRP A's transmission stops at the end of the time period $502_{(4)}$. In some instances, the TBs $610a_{(3)}$ and $610b_{(3)}$ may correspond to the same TB (e.g., a TB A). In other words, the TB A may have two portions, where the first portion is simultaneously transmitted by the TRP A and the TRP B, while the second portion is transmitted by the TRP B. In some other instances, the TBs $610a_{(3)}$ and $610b_{(3)}$ may correspond to different TBs.

In an embodiment, the network may configure a different MCS when changing a serving TRP cluster. For example, the network may configure the first TRP cluster (e.g., the TRP A) to transmit the TB portion $620a_{(1)}$ using one MCS (e.g., quadrature phase-shift keying (QPSK)) and may configure the second TRP cluster (e.g., the TRP B) to transmit the TB portion $620b_{(1)}$ using another MCS (e.g., 16-quadrature amplitude modulation (16-QAM)) in the time period $602_{(1)}$. Similarly, the network may configure the third TRP cluster (e.g., the TRP A and the TRP B) to transmit the TB portions $620a_{(4)}$ and $620b_{(4)}$ using one MCS (e.g., quadrature phase-shift keying (QPSK)) and may configure the second TRP cluster (e.g., the TRP B) to transmit the TB portion $620b_{(5)}$ using another MCS (e.g., 16-quadrature amplitude modulation (16-QAM)). In other words, the MCS may be different for different portions of a TB when a serving TRP cluster changes within the transmission duration of the TB.

The network may further configure the first TRP cluster to transmit a scheduling grant $640_{(1)}$ at the beginning of the time period $602_{(1)}$ (e.g., in a PDCCH portion). The scheduling grant $640_{(1)}$ may indicate a time span or a duration (e.g., number of symbols) for the TB portion $620a_{(1)}$ and a time span for the TB portion $620b_{(1)}$. The scheduling grant $640_{(1)}$ may further indicate a MCS (e.g., QPSK) for the TB portion $620a_{(1)}$ and a MCS (e.g., 16-QAM) for the TB portion $620b_{(1)}$.

Similarly, the TRP A and/or the TRP B may transmit a scheduling grant $640_{(2)}$ at the beginning of the time period $602_{(2)}$ to indicate a schedule (e.g., durations and MCSs) for the TBs $610a_{(2)}$ and $620b_{(2)}$. The TRP A and/or the TRP B may transmit a scheduling grant $640_{(3)}$ at the beginning of the time period $602_{(3)}$ to indicate a schedule for the TBs $610a_{(3)}$ and $610b_{(3)}$.

In an embodiment, a TRP may transmit a reference signal (e.g., a DMRS) along with a TB or a TB portion to facilitate channel estimation, demodulation, and decoding at the UE. For simplicity of illustration and discussion, the inclusion of the reference signals 612 are illustrated and described with respect to the transmissions of the TBs $610a_{(3)}$ and $610b_{(3)}$ during the time period $602_{(3)}$. However, the TBs $610_{(1)}$, $610a_{(2)}$, and $610b_{(2)}$ can also be transmitted along with similar reference signals 612. As shown, during the time period $502_{(4)}$, the TRP A may transmit a reference signal $612a_{(1)}$ along with the TB portion $620a_{(4)}$ and the TRP B may transmit a reference signal $612b_{(1)}$ along with the TB portion $620b_{(4)}$. The reference signals $612a_{(1)}$ and $612b_{(1)}$ may be transmitted using orthogonal resources, for example, different time and/or frequency resources, different sequences, and/or with difference codes. Each reference signal 612 may include pilot symbols distributed over a frequency band. The UE may perform channel estimation based on the reference signals $612a_{(1)}$ and $612b_{(1)}$. The UE may decode the TBs portions $620a_{(4)}$ and $620b_{(4)}$ based on the channel estimates.

In an embodiment, a network may schedule one or more additional reference signals along with a TB transmission to improve channel estimation performance or when a serving TRP cluster changes within the transmission duration of a TB. As shown, when the serving TRP cluster changes from the third TRP cluster (e.g., the TRP A and the TRP B) in the time period $502_{(4)}$ to the second TRP cluster (e.g., the TRP B) in the time period $502_{(5)}$, an additional reference signal $612b_{(2)}$ may be included in the transmission of the TB portion $620b_{(5)}$ of the TB $610b_{(3)}$.

In an embodiment, the scheduling grant $640_{(3)}$ may indicate whether the reference signals $612b_{(2)}$ in the time period $502_{(5)}$ is quasi-co-located with the reference signal $612b_{(1)}$ in the previous time period $502_{(4)}$. In 3GPP document TS 38.211, version 15.1.0, March 2018, which is incorporated herein by reference in its entirety and for all applicable purposes, the term "QCL" may refer to the QCL of antenna ports, where large-scale properties of the channel over which a symbol on one antenna port is conveyed can be inferred from the channel over which a symbol on the other antenna port is conveyed. The large-scale properties may include one or more of delay spread, Doppler spread, Doppler shift, average gain, average delay, and/or spatial receive parameters. In addition, for DMRS associated with a PDSCH, the channel over which a symbol on one of these antenna ports is conveyed can be inferred from the channel over which another symbol on the same antenna port is conveyed only when the two symbols are within the same scheduled PDSCH, the same slot, and in the same precoding resource block (PRG), where PRG is described in 3GPP document TS 38.214, version 15.1.0, March 2018, which is incorporated herein by reference in its entirety and for all applicable purposes.

Thus, QCL is present between the reference signals $612b_{(1)}$ and $612b_{(2)}$ when large-scale channel properties conveyed by the reference signal $612b_{(2)}$ is associated with large-scale channel properties conveyed by the reference signal $612b_{(1)}$ and the reference signals $612b_{(1)}$ and $612b_{(2)}$ are transmitted within the same scheduled PDSCH.

In an embodiment, the scheduling grant $640_{(3)}$ may indicate whether the channel over the reference signal $612b_{(2)}$ in the time period $502_{(5)}$ can be inferred from the channel over the reference signal $612b_{(1)}$ in the previous time period $502_{(4)}$.

As an example, when the TB $610a_{(3)}$ and the TB $610b_{(3)}$ are different, independent TBs, the scheduling grant $640_{(3)}$ may indicate that the reference signals $612b_{(1)}$ and $612b_{(2)}$ are quasi-co-located and/or the channel over the reference signal $612b_{(2)}$ can be inferred from the channel over the reference signal $612b_{(1)}$. Conversely, when the TB $610a_{(3)}$ and the TB $610b_{(3)}$ correspond to the same TB, the scheduling grant $640_{(3)}$ may indicate that the reference signals are non-quasi-co-located or the channel over the reference signal $612b_{(2)}$ cannot be inferred from the channel over the reference signal $612b_{(1)}$.

Upon receiving an indication indicating that the reference signals $612b_{(2)}$ is quasi-co-located with the previously received reference signal $612b_{(1)}$, the UE may perform channel estimation using large-scale channel properties (e.g., a delay profile, a frequency-shift, and/or a timing offset) identified from the previously received reference signal $612b_{(1)}$.

Upon receiving an indication indicating that the channel over the reference signals $612b_{(2)}$ can be inferred from the channel over the previously received reference signal $612b_{(1)}$, the UE may perform channel estimation by combining (e.g., averaging) the received reference signals $612b_{(1)}$ and $612b_{(2)}$. The use of the previously identified large-scale channel properties and/or the combining of the received reference signals $612b_{(1)}$ and $612b_{(2)}$ may allow the UE to improve channel estimation performance (e.g., for delay-spread estimation, Doppler speed estimation, and time-offset estimation and correction).

While not shown, the TRP A may include a first reference signal in the transmission of the TB portion $620a_{(1)}$ and the TRP B may include a second reference signal in the transmission of the TB portion $620b_{(1)}$. The scheduling grant $640_{(1)}$ may include an indication indicating that the first and second reference signals are non-QCL with each other and/or the channel over the second reference signal $612b_{(2)}$ can be inferred from the channel over the first reference signal $612b_{(1)}$. The UE may perform channel estimation using the first reference signal to demodulate and decode the TB portion $620a_{(1)}$ and using the second references signal to demodulate and decode the TB portion $620b_{(1)}$.

While the scheme 600 is illustrated with a TB scheduling (e.g., for the TB $610_{(1)}$) across two PDSCH grids 506, the scheme 600 may be applied for scheduling a TB across any suitable number of PDSCH grids (e.g., about 3, 4, or more).

In the scheduling schemes discussed above in connections with FIGS. 5 and 6, each UL and DL transmission is scheduled by the network. For example, a scheduling grant 640 grant may include scheduling information and reference signal information regarding an UL/DL communications. A BS may transmit a DL communication signal to a UE via a PDSCH according to a DL scheduling grant. A UE may transmit a UL communication signal to a BS via a PUSCH and/or PUCCH according to a UL scheduling grant. Using additional control signaling, however, can increase overhead (e.g., reducing amount of resources for URLLC data), increase latency (e.g., additional time associated with decoding grant for URLLC data), degrade reliability (e.g., increases likelihood of a decoding failure of the grant), or otherwise negatively impact URLLC applications. Semi-persistent scheduling (SPS) may be used as an alternative to the scheduling schemes of FIGS. 5 and 6, to reduce these undesired effects. SPS in a TRP environment is described in U.S. Application No. 62/634,106, filed Feb. 22, 2018, for "Enhanced Uplink Grant-Free/Downlink Semi-Persistent Scheduling For Ultra-Reliable Low Latency Communications", which is incorporated herein by reference in its entirety and for all applicable purposes.

SPS was introduced to support applications with (semi) periodic traffic to eliminate (or reduce) PDCCH overhead where data inter-arrival times are constant. When a UE is configured with SPS, certain parameters, such as the number of HARQ processes, periodicity, offset, etc., can be indicated via RRC. The UE may store the configuration parameters. The UE can then be explicitly activated to use such parameters (e.g., via PDCCH) for multiple additional SPS transmissions (e.g., without monitoring/decoding additional PDCCH). For example, a DCI transmission may contain a field indicating that some subsequent DL communications will be made in accordance with a set of previously configured SPS parameters. The UE may then receive the communication in those TBs without further control signaling from the network. The PDCCH that activates the SPS transmissions may have a cyclic redundancy check (CRC) scrambled by a SPS radio network temporary identifier (RNTI) configured for the UE In a multi-TRP environment, a UE may be in communications with more than one TRP, and DL SPS may be configured for one, some, or all of them. In an embodiment, DL SRS is configured for each TRP separately. That is, a DL SRS configuration is associated with a first TRP; a second DL SRS configuration is associated with a second TRP; and so on. Each DL SRS configuration specifies DL SRS parameters to be used by the UE when receiving DL communications from the corresponding TRP. DL SRS may then be activated for individual TRPs as needed. For example, a UE may receive DL communications from two TRPs, wherein DL communications from a first TRP is periodic and DL communication from the second TRP is sometimes periodic and sometimes are not periodic. A DL SRS configuration for the second TRP may be activated when the DL communications are periodic and deactivated when the communications are not periodic.

In another embodiment, DL SRS is configured for some or all of the TRP collectively. That is, a DL SRS configuration may include SRS paremeters for more than one TRP. A DCI may then activate or deactivate DL SRS for all of the configured TRP at once.

Figure 7A:
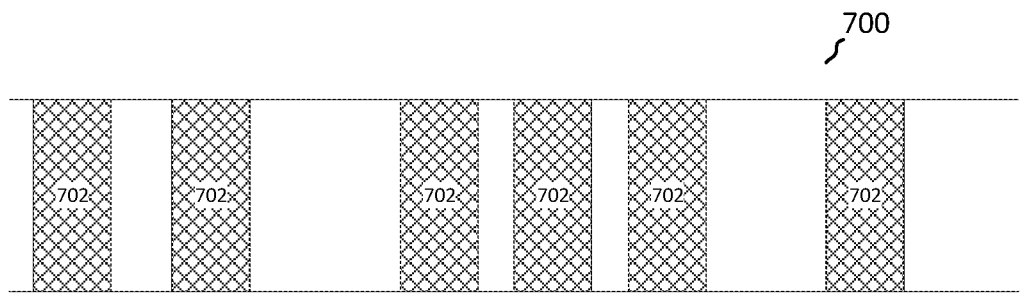
FIGS. 7a-7c illustrates multi-TRP scheduling schemes according to some embodiments of the present disclosure.

When activated, a DL SRS configuration allocates various resources for DL communication. FIG. 7a illustrates various resources allocation scenarios when using DL SPS in a multi-TRP environment. In scheduling scheme 700, shown in FIG. 7a, all TRPs are scheduled for the same resources, such that both TRP A and TRP B may transmit during TBs 702. If both TRP A and TRP B have DL data for the UE, they may both transmit during TB 702. If one of the TRPs does not have any data it need not transmit during TB 702. In an embodiment, a TRP transmits even if it doesn't have anything to send the UE. In another embodiment it is configurable whether the TRP transmits when there is no DL data to send.

Figure 7B:
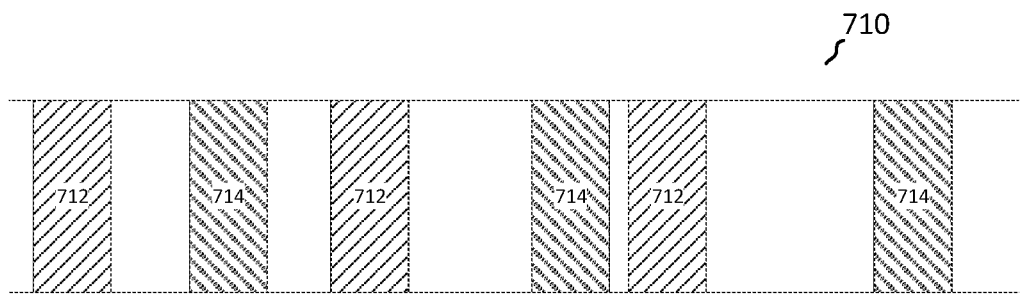
Figure 7C:
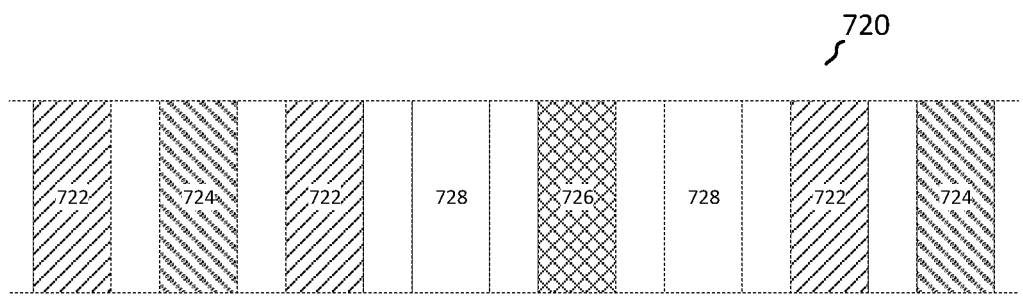

FIG. 7b illustrates scheduling scheme 710 in which each TRP is scheduled with separate resources. For example, TRP A is scheduled for DL communications using TBs 712 and TRP B is scheduled for DL communications using TBs 714.

In FIG. 7a, the resources are fully aligned, whereas in FIG. 7b, the resources are separate. A more general scheduling scenario is shown by scheduling scheme 720 in FIG. 7c, wherein some resources are scheduled for multiple TRPs and other resources are scheduled for just one TRP. In particular, TRP A is scheduled to use TBs 722, TRP B is scheduled to use TBs 724, and both TRP A and TRP B are scheduled to use TBs 726. Although FIG. 7 only shows two TRPs, it should be understood that more than two TRPs may be accommodated by extension of the concepts presented.

In scheduling scheme 710, different TRPs never transmit during the same DL-SRS scheduled TB. However, in schemes 700 and 720, a UE may receive DL communications from multiple TRPs in the same TB. In an embodiment, the UE may perform SPS reception under the hypothesis that only one TRP is not serving any data. That is, the UE may process TB 702 or TB 722 under the hypothesis that TRP A is transmitting and TRP B is not. It may also process TB 702 or TB 722 under the opposite hypothesis, e.g. that TRP B is transmitting and TRP A is not. In an alternative embodiment, the UE also performs SRS reception under a third hypothesis that both TRP A and B are transmitting. The UE may assume that both TRPs are transmitting the same TB, that is the same data. SPS reception for the third hypothesis may require more processing resources.

In a typical non-multi-TRP environment, a single set of SPS parameters may be configured via RRC or other configuration signaling. A DCI transmission may then activate or deactivate the single SPS configuration. There is no ambiguity about which SRS configuration the DCI is activating or deactivating. In a multi-TRP environment, however, multiple sets of SPS parameters may be configured. Accordingly, the DCI must specify which SPS configuration is be activated or deactivated. In an embodiment, the DCI includes an explicit field to identify the applicable SPS configuration. The field may be an identifier, a table index, bitmap, or other value to refer to an SPS configuration. In an embodiment in which DL SRS is configured for each TRP, a bitmap may provide a mechanism for activating or deactivating more than one SRS configuration with one DCI.

In an embodiment, a TCI/QCL may be used to refer to an SPS configuration. A SPS configuration has a TCI/QCL when it is configured. This TCI can be associated with the configuration. Another SPS configurations received from a different TRP will likely have a TCI/QCL that is distinct in some way from the other TCI/QCL. The coreset where a DCI is decoded will have an associated TCI/QCL. The DCI associated TCI/QCL may then be used to select a corresponding SRS configuration. For example, a SRS configuration with a matching TCI/QCL may be selected, wherein matching may mean they are sufficiently similar to distinguish from other non-matching TCI/QCL.

In an embodiment in which a SPS configuration includes parameters for multiple TRPs, a DCI to activate/deactivate an SPS configuration may include a TCI state reconfiguration.

Figure 8:
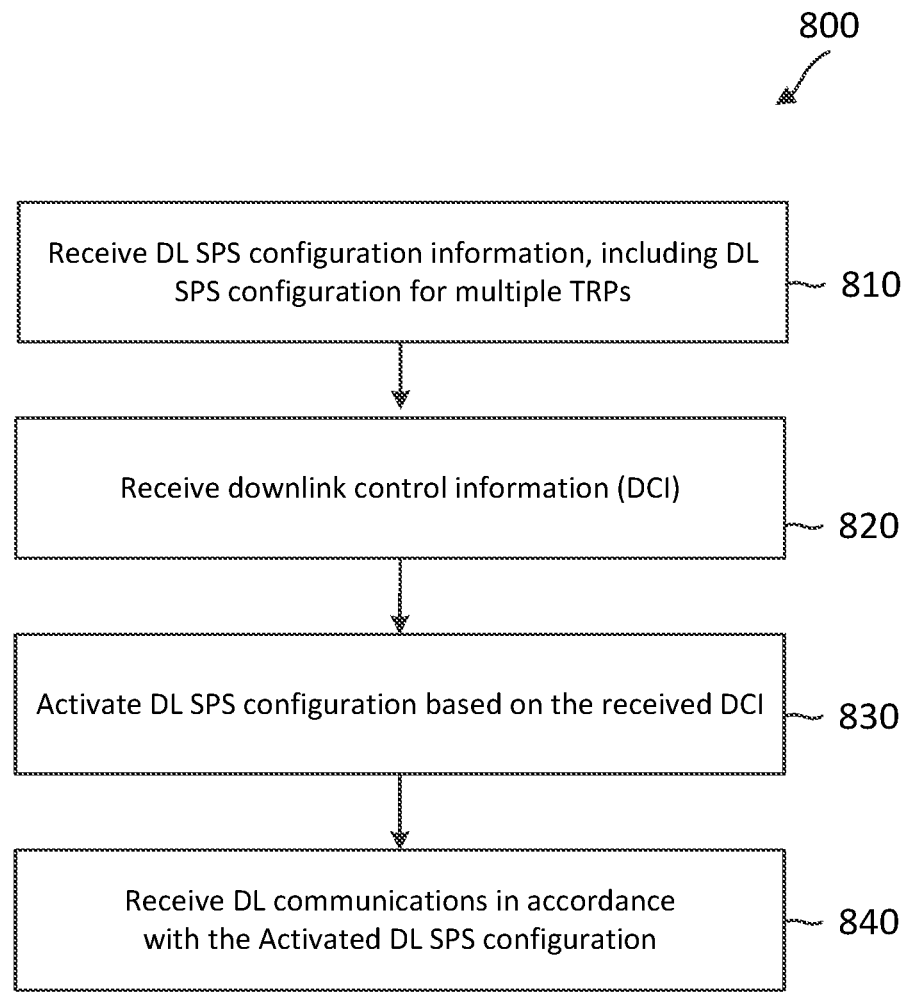
FIG. 8 is a flow diagram of a multi-TRP-based communication method according to embodiments of the present disclosure.

FIG. 8 is a flow diagram of a multi-TRP-based communication method 800 according to embodiments of the present disclosure. Steps of the method 800 can be executed by a computing device (e.g., a processor, processing circuit, and/or other suitable component) of a wireless communication device, such as the UEs 115, 215, and 300. The method 800 may employ similar mechanisms as in the schemes 500, and 600, and 700 described above with respect to FIGS. 5, 6, and 7, respectively. As illustrated, the method 800 includes a number of enumerated steps, but embodiments of the method 800 may include additional steps before, after, and in between the enumerated steps. In some embodiments, one or more of the enumerated steps may be omitted or performed in a different order.

At step 810, the method 800 includes receiving, by a wireless communication device, DL SPS configuration information, including DL SPS configuration for multiple TRPs.

At step 820, the method 800 includes receiving, by the wireless communication, downlink control information (DCI).

At step 830, the method 800 includes activating by the wireless device a DL SPS configuration based on the DCI. As described above, the SPS configuration may be indicated by an identifier, table index, bitmap, comparison of TCI/QCL, or other means.

At step 840, the method 800 includes receiving DL communications in accordance with the activated DL SPS configuration.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
receiving, by a wireless communication device from a network, at least one downlink (DL) semi-persistent scheduling (SPS) configuration information, including DL SPS configurations for multiple transmissions reception points (TRP);
receiving, by the wireless communication device from the network, downlink control information (DCI);
activating at least one DL SPS configuration based on the received DCI;
receiving DL communications from the multiple TRPs in accordance with the activated DL SPS configuration, wherein receiving DL communications includes receiving communications under a hypothesis that a transmission is received from only one of the multiple TRPs.

2. The method of claim 1, wherein receiving at least one DL SPS configuration information comprises receiving at least one DL SPS configuration including parameters for at least two TRPs.

3. The method of claim 2, wherein activating at least one DL SPS configuration based on the received DCI comprises activating at least one DL SPS configuration including parameters for at least two TRPs.

4. The method of claim 2, wherein the DCI comprises activation information of the DL SPS configuration indicating a selection of TRPs in the DL SPS transmission.

5. The method of claim 4, wherein
each DL SPS configuration corresponds with a set of transmission configuration information (TCI) combinations; and
each DCI corresponds with a particular TCI combination.

6. The method of claim 1, wherein receiving DL SPS configuration information comprises:
receiving first DL SPS configuration information for a first TRP;
receiving second DL SPS configuration information for a second TRP.

7. The method of claim 6, wherein the first DL SPS configuration configures at least one transmission from the first TRP, and the second DL SPS configuration configures at least one transmission from the second TRP.

8. The method of claim 7, wherein
each DL SPS configuration corresponds with a first TCI or QCL; and
each DCI corresponds with a DL SPS configuration.

9. The method of claim 6, wherein receiving DCI comprises receiving a first DCI including activation information for the first DL SPS configuration, and a receiving second DCI including activation information for the second DL SPS configuration.

10. The method of claim 6, wherein receiving DCI comprises receiving a DCI including activation information for both the first DL SPS configuration and the second DL SPS configuration.

11. Apparatus for wireless communication, comprising:
means for receiving from a network, at least one downlink (DL) semi-persistent scheduling (SPS) configuration information, the information including DL SPS configurations for multiple transmissions reception points (TRP),
means for receiving downlink control information (DCI), the DCI identifying at least one of the received DL SPS configurations; and
means for receiving DL communications from TRPs in accordance with the identified DL SPS configuration, wherein the means for receiving DL communications includes means for receiving communications under a hypothesis that a transmission is received from only one of the multiple TRPs.

12. The apparatus of claim 11, wherein the at least one DL SPS configuration information comprises at least one DL SPS configuration including parameters for at least two TRPs.

13. The apparatus of claim 11, wherein the DCI comprises information of the DL SPS configuration indicating a selection of TRPs in the DL SPS transmission.

14. The apparatus of claim 13, wherein
each DL SPS configuration corresponds with a set of transmission configuration information (TCI) combinations; and
each DCI corresponds with a particular TCI combination.

15. The apparatus of claim 11, wherein the received DL SPS configuration information includes first DL SPS configuration information for a first TRP and second DL SPS configuration information for a second TRP; and
the means for receiving DL communications from at least two TRPs on orthogonal resources comprises means for receiving DL communications for the first and second TRPs according to the first and second DL SPS configuration information, respectively.

16. The apparatus of claim 15, wherein the means receiving DL communications from at least two TRPs on orthogonal resources comprises means for receiving at least one transmission from the first TRP and at least one transmission from the second TRP.

17. The apparatus of claim 16, wherein
each DL SPS configuration corresponds with a TCI or QCL; and
each DCI corresponds with a DL SPS configuration.

18. The apparatus of claim 15, wherein the DCI comprises first DCI including first information for the first DL SPS configuration, and second DCI including second information for the second DL SPS configuration; and
the means for receiving DL communications from at least two TRPs on orthogonal resources comprises means for receiving the first and second DL communications according to the respective first and second information.

19. The apparatus of claim 15, wherein the DCI includes information for both the first DL SPS configuration and the second DL SPS configuration; and
for receiving DL communications from at least two TRPs on orthogonal resources comprises means for receiving the first and second DL communications according to the respective first and second information.

20. The apparatus of claim 11, wherein the at least one received DL SPS configuration is identified by one of a table index, a bitmap, or a DCI field value.

21. Apparatus comprising:
a transceiver;
a memory; and
a processor communicatively coupled to the transceiver and the memory;
wherein the memory is configured with program code for causing the processor to communicate via the transceiver to
receive at least one downlink (DL) semi-persistent scheduling (SPS) configuration information, including DL SPS configurations for multiple transmissions reception points (TRP);
receive downlink control information (DCI);
activate at least one DL SPS configuration based on the received DCI; and
receive DL communications from the multiple TRPs in accordance with the activated DL SPS configuration, wherein causing the processor to receive DL communications includes causing the processor to receive communications under a hypothesis that a transmission is received from only one of the multiple TRPs.

22. The apparatus of claim 21, wherein being configured to cause the processor to receive at least one DL SPS configuration information comprises being configured to cause the processor to receive at least one DL SPS configuration including parameters for at least two TRPs.

23. The apparatus of claim 22, wherein being configured to cause the processor to activate at least one DL SPS configuration based on the received DCI comprises being configured to cause the processor to activate at least one DL SPS configuration including parameters for at least two TRPs.

24. The apparatus of claim 22, wherein the DCI comprises activation information of the DL SPS configuration indicating a selection of TRPs in the DL SPS transmission; and being configured to cause the processor to activate at least one DL SPS configuration comprises being configured to cause the processor to activate the at least one DL SPS configuration for the selection of TRPs.

25. The apparatus of claim 24, wherein
each DL SPS configuration corresponds with a set of transmission configuration information (TCI) combinations; and
each DCI corresponds with a particular TCI combination.

26. The apparatus of claim 21, wherein being configured to cause the processor to receive DL SPS configuration information comprises:
being configured to cause the processor to receive first DL SPS configuration information for a first TRP; and
being configured to cause the processor to receive second DL SPS configuration information for a second TRP.

27. The apparatus of claim 26, wherein being configured to cause the processor to activate the at least one DL SPS configuration based on the received DCI comprises being configured to cause the processor to configure the receiver for at least one transmission from the first TRP according to the first DL SPSP configuration, and the second TRP according to the second DL SPS configuration.

28. The apparatus of claim 27, wherein
each DL SPS configuration corresponds with a first TCI or QCL; and
each DCI corresponds with a DL SPS configuration.

29. The apparatus of claim 26, wherein being configured to cause the processor to receive the DCI comprises being configured to cause the processor to receive a first DCI including activation information for the first DL SPS configuration, and a to receive a second DCI including activation information for the second DL SPS configuration.

30. The apparatus of claim 26, wherein being configured to cause the processor to receive the DCI comprises being configured to cause the processor to receive a DCI including activation information for both the first DL SPS configuration and the second DL SPS configuration.

31. The method of claim 1, wherein receiving DL communications further includes receiving communications under a hypothesis that a transmission is received from more than one of the multiple TRPs.

32. The apparatus of claim 11, wherein the means for receiving DL communications includes means for receiving communications under a hypothesis that a transmission is received from more than one of the multiple TRPs.

33. The method of claim 21, wherein causing the processor to receive DL communications further includes causing the processor to receive communications under a hypothesis that a transmission is received from more than one of the multiple TRPs.

* * * * *